US008463289B2

(12) United States Patent
Shklarski et al.

(10) Patent No.: US 8,463,289 B2
(45) Date of Patent: Jun. 11, 2013

(54) DEPERSONALIZING LOCATION TRACES

(75) Inventors: Gil Shklarski, Redmond, WA (US); Brian Beckman, New Castle, WA (US); Eyal Ofek, Redmond, WA (US); Kenn Daniel Cartier, Redmond, WA (US); Shai Herzog, Bellevue, WA (US); Gur Kimchi, Bellevue, WA (US); Bernard Lawrence Johnston, Lafayette, CO (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/163,396

(22) Filed: Jun. 17, 2011

(65) Prior Publication Data
US 2012/0322458 A1 Dec. 20, 2012

(51) Int. Cl.
*H04W 24/00* (2009.01)
(52) U.S. Cl.
USPC ............... 455/456.1; 455/410; 455/414.1; 726/26
(58) Field of Classification Search
USPC ................................ 455/456.1–456.6, 457
See application file for complete search history.

(56) References Cited

U.S. PATENT DOCUMENTS

| 7,603,317 | B2 | 10/2009 | Adler et al. |
| 7,630,986 | B1 | 12/2009 | Herz et al. |
| 7,894,801 | B2 | 2/2011 | Zellner et al. |
| 2002/0073138 | A1 | 6/2002 | Gilbert et al. |
| 2005/0183143 | A1 | 8/2005 | Anderholm et al. |
| 2009/0197582 | A1 | 8/2009 | Lewis et al. |
| 2009/0326791 | A1 | 12/2009 | Horvitz et al. |
| 2010/0064373 | A1* | 3/2010 | Cai et al. ............... 726/26 |
| 2010/0199098 | A1 | 8/2010 | King |

FOREIGN PATENT DOCUMENTS

| EP | 2242292 A1 | 10/2010 |
| JP | 2004334433 A | 11/2004 |

OTHER PUBLICATIONS

Cobb, Michael, "Will a Database Anonymization Implementation Succeed?", Retrieved at <<http://searchsecurity.techtarget.com/expert/KnowledgebaseAnswer/0,289625,sid14_gci1377872,00.html>>, Sep. 23, 2009, pp. 4.
Girish, et al., "Anonymity-Preserving Location Data Publishing", Retrieved at <<http://ieeexplore.ieee.org/stamp/stamp.jsp?tp=&arnumber=4674271>>,Proceedings of 17th International Conference on Computer Communications and Networks, 2008, pp. 6.
"International Search Report", Mailed Date: Feb. 26, 2013, Application No. PCT/US2012/042419, Filed Date: Jun. 14, 2012, pp. 1-8. (MS# 331638.02).

\* cited by examiner

*Primary Examiner* — Vladimir Magloire

(57) ABSTRACT

Positional information is provided while minimizing the possibility that personally identifiable information can be derived therefrom. Positional information is received in the form of trails that can be aggregated. Individual cells of a grid reflect a quantity of aggregated trails through those cells, an average intensity and direction of movement through those cells, or a more detailed distribution thereof. Alternatively, individual trails are aggregated to an aggregated trail in the form of a line. Further obfuscation of personally identifiable information occurs by resampling aggregated positional information, by introducing false positional information, or by falsely modifying existing positional information, in a manner that does not impact the overall aggregations, and by pruning, or deleting, positional information, especially around sensitive locations, such as a user's home, place of business, or other location that users typically would seek to keep private. Provision of positional information is delayed until a sufficient amount is received.

20 Claims, 6 Drawing Sheets

DEPERSONALIZING LOCATION TRACES

BACKGROUND

Modern computing devices often have the capability of determining positional information. For example, many modern computing devices incorporate Global Positioning System (GPS) capabilities that enable those computing devices to utilize the Global Positioning System to determine their location, their speed, and other like positional information. Other modern computing devices, such as those that do not incorporate GPS capabilities, can, nevertheless, have access to information that can enable those computing devices to determine positional information. For example, computing devices comprising cellular capability can utilize signal triangulation and other like mechanisms to determine their location based on the signals they receive from cellular communication towers or base stations. Similarly, computing devices comprising wireless networking capability can determine their location based on, for example, known locations of wireless networks with which such computing devices may be communicationally coupled.

Computing devices that comprise the capability of determining positional information are fairly ubiquitous. For example, many users carry with them a cellular computing device, a personal navigation computing device, a tablet computing device, or other like portable computing devices. Additionally, users own or operate equipment that itself comprises computing devices that can determine positional information. For example, many modern vehicles comprise in-vehicle navigation computing devices, or other like computing devices, which, in addition to providing computing services within the vehicle, can also determine the vehicle's position and other positional information.

The positional information acquired by computing devices, or on behalf of computing devices by the infrastructure that those computing devices utilize, such as cellular communication networks, GPS systems and other wireless communication networks, can be utilized to improve geographic information. For example, the positional information from a myriad of computing devices can provide information regarding the precise locations of roads, whether certain roads are open or closed, whether certain interchanges exist, and whether they are in use or not, and other like geographic information. The positional information from a myriad of computing devices can further provide information regarding various restrictions that may be imposed upon roads, or other geographic locations, such as roads that support multiple different directions of travel depending on time of day, interchanges that can limit turns during certain times of day, parks that may be open or closed depending on the season, and other like restrictions.

Unfortunately, positional information, by its very nature, conveys personally identifiable information that can comprise information that many users would not wish to have disseminated. For example, positional information that identifies a user leaving a particular residence and traveling to a particular place of employment can be fairly easily linked to a specific person, since it is likely that only one individual working at that place of employment lives at the residence. Thus, even though there was no other identifying information, the mere positional information by itself enabled the identification of a user. In such a manner a user's activities could be tracked and monitored. Consequently, benefits from positional information, such as improved and updated geographic information, cannot be realized unless positional information can be presented such that the derivation of personally identifiable information therefrom is minimized.

SUMMARY

In one embodiment, positional information, in the form of trails comprising a series of discrete locations of a particular computing device, can be processed to decrease the derivability of personally identifiable information from such positional information. Aggregations of positional information, that have been processed to decrease the derivability of personally identifiable information, can be provided to third parties.

In another embodiment, positional information in the form of trails comprising a series of discrete locations of a particular computing device can be aggregated with reference to a geographic grid such that individual grid cells comprise information aggregated from multiple trails from multiple computing devices passing through those grid cells. Personally identifiable information can be lost, or obfuscated, through such aggregation. The individual grid cells can comprise information regarding a quantity of trails through a grid cell, directional or velocity averages for a grid cell, or statistical distributions thereof.

In a further embodiment, positional information in the form of trails of discrete locations of a particular computing device can be aggregated into a one-dimensional line representing an aggregated trail. Individual trails can be further aggregated into an aggregated trail through weighted averaging of positional differences between the aggregated trail and the individual trail being aggregated into it. As before, personally identifiable information can be lost, or obfuscated, through such aggregation.

In a still further embodiment, aggregations of positional information in the form of trails of discrete locations of a particular computing device can be further processed to render more difficult the derivation of personally identifiable information from such positional information. Further processing can include resampling of aggregations of individual trails, modifications of individual trails in a manner that does not meaningfully impact overall aggregations, and deletion of portions of trails proximate to sensitive locations, such as a user's home, place of business, or locations that, by their nature, reveal information about users that those users would prefer to remain private.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
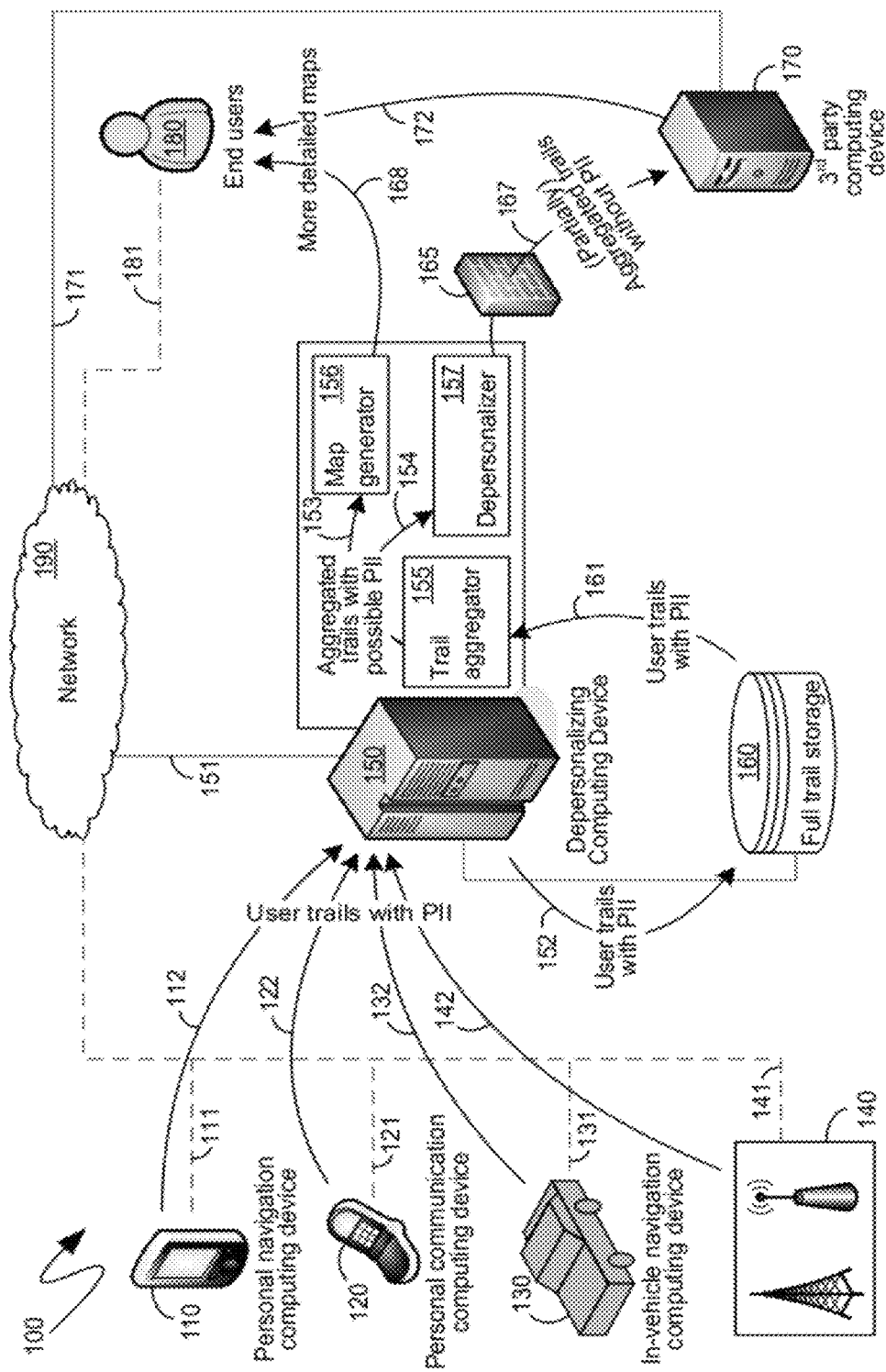
FIG. 1 is a block diagram of an exemplary system that provides aggregated positional information without personally identifiable information.

The following description relates to the provision of positional information while minimizing the possibility that personally identifiable information can be derived, or gleaned, therefrom. Positional information can be received in the form of trails comprising a series of discrete locations of a particular computing device that have been recorded over a period of time. To minimize the possibility that personally identifiable information can be derived from such positional information, the received trails can be aggregated. Such an aggregation can be in the context of a grid, where individual cells reflect a quantity of aggregated trails through those cells, reflect an average intensity and direction of movement through those cells, or comprise a statistical distribution of the intensity and direction of movement, such as within specific ranges of time. Such an aggregation can also be in the context of a line, where individual trails are aggregated to an aggregated trail in the form of a line. Further obfuscation of personally identifiable information can be achieved by resampling aggregated positional information, by introducing false positional information, or by falsely modifying existing positional information, in a manner that does not impact the overall aggregations, and by pruning, or deleting, positional information, especially around sensitive locations, such as a user's home, place of business, or other location that users typically would seek to keep private. If an insufficient amount of positional information has been received, the provision of positional information can be delayed until a sufficient amount is received to sufficiently reduce the possibility the personally identifiable information being derived therefrom.

The techniques described herein focus on, but are not limited to, the provision of outdoor positional information in such a manner that personally identifiable information is difficult to derive therefrom. Typically such outdoor positional information is utilized to improve existing geographic information, such as maps, including improving both locational information, such as where a road precisely is located, and restriction information, such as whether an intersection comprises a turn restriction during certain hours of the day. Nevertheless, the techniques described herein are applicable to any collection of positional information that can be aggregated across multiple users or multiple computing devices and, thereby, at least partially obfuscate personally identifiable information. For example, the techniques described are equally applicable to user positional information acquired from indoor spaces, such as a mall, office complex, warehouse, or other like spaces. Consequently, the descriptions below are not meant to limit the invention to the specific implementations and environments described and illustrated.

As utilized herein, the term "personally identifiable information" or "PII" means any information that is not otherwise publically known and that is identified as being of, or belonging to, a specific user or individual. Consequently, as utilized herein, the "removal" of PII means the obfuscation of PII such that deriving PII from a set of data that has had PII "removed" from it is made impractical and substantially more difficult. The "removal" of PII, as utilized herein, does not necessarily mean the mathematical removal of PII from a set of data such that it is mathematically impossible to derive PII therefrom, though it does encompass such mathematical removal as well. Similarly, as utilized herein, data "without" PII means information from which it is impractical to derive PII and does not necessarily mean, though it does encompass, information that cannot, mathematically, have PII derived therefrom.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is illustrated comprising a depersonalizing computing device 150 that receives positional information in the form of trails comprising a series of discrete locations of particular computing devices. For shorthand, such positional information will be referred to hereinafter simply as "trails" or "user trails". The depersonalizing computing device 150 can comprise a communicational connection 151 to a network 190. While, in one embodiment, the network 190 can represent a wide area amalgamation of computing devices, such as the ubiquitous Internet, in other embodiments the network 190 can be more rigorously defined, and can be a closed, protected network. The network 190 can also represent a sub-network, or other collection of identifiable computing devices, established within the context of a larger network, such as the ubiquitous Internet.

A wide range of computing devices can be the source of the user trails received by the depersonalizing computing device 150. For example, personal navigation computing devices, such as the personal navigation computing device 110, can comprise GPS capabilities and can, thereby, determine their location. Personal navigation computing devices can be communicationally coupled, either directly or indirectly, to a network, such as the network 190. For example, a personal navigation computing device can comprise wireless or cellular network communication capability and can, thereby, directly communicate with other computing devices on the network 190. As another example, a personal navigation computing device can comprise communicational capability through which it can be communicationally coupled with another computing device, such as a personal computing device. Such a personal computing device can receive positional information that can have been stored on the personal navigation computing device and that personal computing device can then upload the same to the network 190 via a communicational connection to the network 190 that is maintained by such a personal computing device. The communicational connection 111 between the personal navigation computing device 110 and the network 190 is illustrated in the system 100 of FIG. 1 with a dashed line to represent that such a communicational connection may be either direct or indirect, such as in the examples provided above.

Another type of computing device that can provide positional information to the depersonalizing computing device 150, in the form of user trails, can be a personal communication computing device, such as the personal communication computing device 120 shown in the system 100 of FIG. 1. Some personal communication computing devices, such as cellular telephones, smart phones, and other like personal communication computing devices, comprise GPS capabilities analogous to those of the personal navigation computing device 110 and, as such, can, in a similar manner, determine their location. Other personal communication computing devices that do not comprise GPS capabilities, can, nevertheless determine their location based upon other available information, such as the signal strengths of various cellular towers or base stations, which can be utilized, with known signal triangulation methodologies, to enable those personal communication computing to determine their location or other like positional information. As with the personal navigation computing device 110, the personal communication computing device 120 is illustrated as being communicationally coupled to a network 190 via a dashed line 121 to indicate that the personal communication computing device 120 can be either directly communicationally coupled to the network 190, such as through a cellular connection, or indirectly communicationally coupled to the network 190, such as by being communicationally coupled with a personal computing device that, itself, maintains a communicational connection to the network 190.

Yet another type of computing device that can provide positional information to the depersonalizing computing device 150 can be in-vehicle navigation computing devices, such as the in-vehicle navigation computing device 130. In-vehicle navigation computing devices can comprise the dedicated navigational systems that can be built into, or added into, vehicles, such as cars, trucks, delivery vans, and other like vehicles. Typically, such in-vehicle navigation computing devices comprise GPS capabilities and, thereby, operate in a manner analogous to the personal navigation computing device 110. Some in-vehicle navigation computing devices further comprise communicational connections to the network 190, such as through wireless or cellular data communications, while other in-vehicle navigation computing devices can be communicationally coupled with a personal computing device, including through an intermediate storage device, such as a "thumb drive", and can, thereby, be indirectly communicationally coupled with the network 190. As before, the in-vehicle navigation computing device 130 is shown as being communicationally coupled to the network 190 via a dashed line 131 to illustrate that such a communicational correction may be either direct or indirect.

In addition to various types of computing devices described above, infrastructure devices can also provide positional information in the form of user trails, or individual user location points that can subsequently be stitched into a user trail. For example, base stations providing wireless network capabilities can record identifiers of computing devices that have communicationally coupled to those base stations. Given the fixed, and known, locations of base stations, and given a limited communicational range of the wireless network provided by such base stations, knowledge of an identifier of a computing device communicationally coupled to such base stations can provide the location of the device, at least to a reasonable degree of accuracy. Similarly, cellular communication towers can maintain signal strength information and identification information of computing devices that have communicationally coupled with such cellular communication towers, such that the data from multiple cellular communication towers, whose positions are fixed and known, can be utilized to derive therefrom positional information for one or more computing devices that communicationally coupled with such cellular communication towers. To illustrate the possibility that user trails can be received from infrastructure devices, such as those described above, infrastructure devices 140 are shown in the system 100 of FIG. 1 as being communicationally coupled with the depersonalizing computing device 150 via the network 190. Such a communicational connection is, again, illustrated via a dashed line, namely the dashed line 141, to illustrate that it can be either a direct or indirect connection.

Although examples of computing devices that can provide positional information have been provided, in order to provide clarity and precision to the descriptions below, such examples are not meant to limit the applicability of the below descriptions only to positional information obtained from the enumerated computing devices. To the contrary, as will be evident to those skilled in the art, the mechanisms described herein are equally applicable to any type of computing device that can provide positional information. Other types of computing devices that can provide positional information that have not been specifically enumerated in the above examples include devices capable of determining location from Radio Frequency (RF) tags or other beacons of any electro-magnetic radiation, surveillance cameras or other audio-visual devices capable of linking a position to a particular user or device, and other like devices.

Each of the exemplary devices 110, 120, 130 and the exemplary infrastructure devices 140 can provide user trails with personally identifiable information to the depersonalizing computing device 150, as illustrated by the communications 112, 122, 132 and 142, respectively. In one embodiment, the depersonalizing computing device 150, receiving such user trails, can store them in a full trail storage 160, as illustrated by the communication 152. Subsequently, the depersonalizing computing device 150 can utilize the user trails stored in the full trail storage 160 to remove therefrom personally identifiable information and then provide such trails without personally identifiable information to third parties that may seek to utilize such information to, for example, generate more detailed and more accurate maps or other like geographic informational instruments. Additionally, in one embodiment, the depersonalizing computing device 150 can utilize the user trails stored in the full trail storage 160 to, itself, generate more detailed maps or other geographic informational instruments that can be made more informative or more accurate via information provided by the user trails that are stored in the full trail storage 160.

In one embodiment, the depersonalizing computing device 150 comprises a trail aggregator 155 that can receive some, or all, of the user trails from the full trail storage 160, as illustrated by the communication 161, and produce therefrom aggregated trails. As will be described in further detail below, the aggregated trails can obfuscate the personally identifiable information of any given individual or given computing device since the aggregated trails comprise information aggregated together from multiple trails, thereby rendering any individual trail more difficult to identify.

In a further embodiment, the aggregated trails produced by the trail aggregator 155 can further be provided to a depersonalizer 157 that can remove any further personally identifiable information, if appropriate, from the aggregated trails produced by the trail aggregator 155. Thus, as shown by the system 100 of FIG. 1, the trail aggregator 155 can provide aggregated trails to the depersonalizer 157, as illustrated by the communication 154. Subsequently, the depersonalizer 157 can provide either partially or fully aggregated trails to third parties, such as to a third party computing device 170, as illustrated by the communication 167. The third-party computing device 170 can then utilize the information received via the communication 167 to generate more detailed maps, or other like geographic informational instruments, and provide the same to end-users 180, either directly or indirectly, as illustrated in communication 172.

Conceptually, the operation of the depersonalizing computing device 150 can be thought of as providing a firewall 165 such that locational information on one side of the firewall 165 can comprise personally identifiable information while locational information on the other side of the firewall 165 can have such personally identifiable information removed. Consequently, within the context of the system 100 shown in FIG. 1, the firewall 165 can divide the system 100 into two parts, with those components illustrated to the left of the firewall 165 having access to information that comprises personally identifiable information, and those components illustrated on the right of the firewall 165 having no such access.

In one embodiment, the depersonalizing computing device 150 can further comprise, or be communicationally coupled with, a map generator 156 that can receive the aggregated trails produced by the trail aggregator 155, as illustrated by the communication 153, and can generate maps, or other geographic informational instruments, that comprise the greater detail or information gleaned from the user trails that were received by the depersonalizing computing device 150. In such an embodiment, the map generator 156 can be "behind" the firewall 165 and, as such, can receive aggregated trails that may still comprise some personally identifiable information. Like the third-party computing device 170, the map generator 156 can provide more detailed maps, or other geographic informational instruments, to end-users 180, again either directly or indirectly, as illustrated by the communication 168.

In the illustrated embodiment of the system 100 of FIG. 1, the depersonalizing computing device 150 is illustrated as comprising a separate trail aggregator 155 and a separate depersonalizer 157. However, such a division is shown strictly for conceptualization and ease of description. As will be recognized by those of skill in the art, the mechanisms described below can be equally implemented by a single omnibus component, by multiple components operating in parallel, or other like componentized divisions of functionality. Before proceeding with such detailed descriptions, however, a more detailed description of a computing device, that can act as the basis for the mechanisms described herein, is provided with reference to FIG. 2

Figure 2:
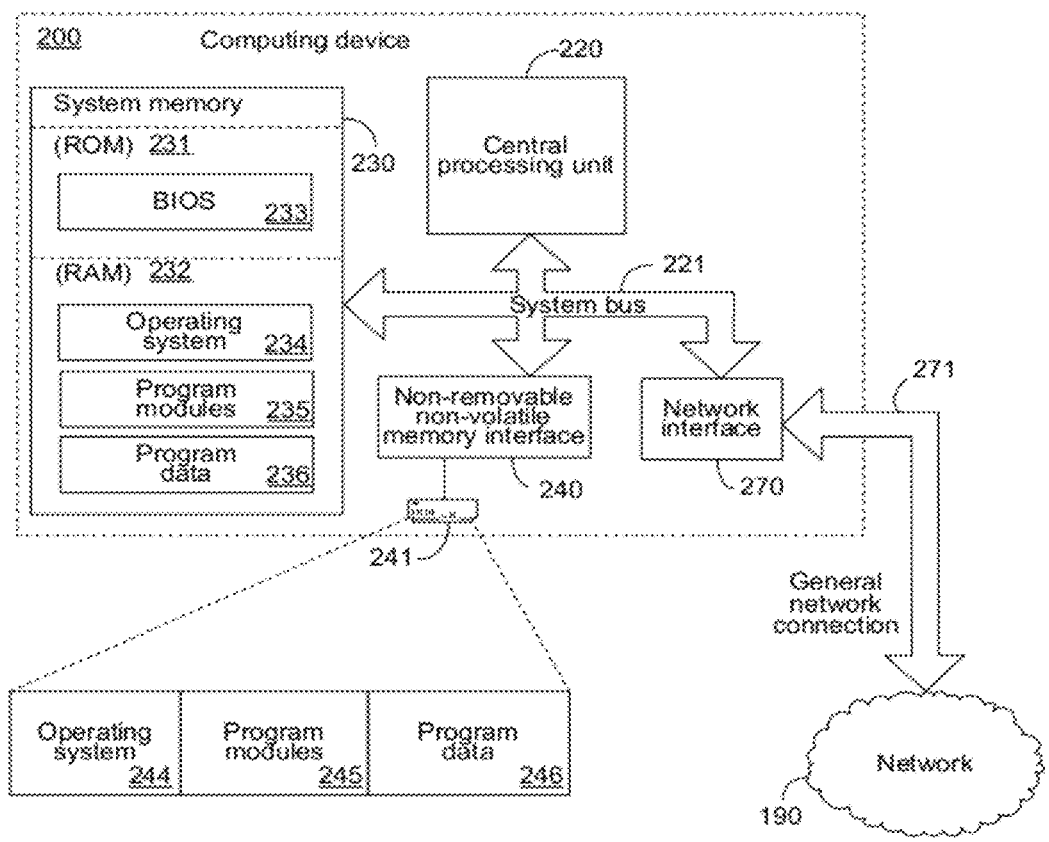
FIG. 2 is a block diagram of an exemplary computing device.

Turning to FIG. 2, an exemplary computing device 200 is illustrated. The computing device 200 can represent any of the computing devices 110, 120, 130, 150 and 170 shown in FIG. 1, as well as any of the devices that are part of the infrastructure devices 140, also shown in FIG. 1. The exemplary computing device 200 can include, but is not limited to, one or more central processing units (CPUs) 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. Depending on the specific physical implementation, one or more of the CPUs 220, the system memory 230 and other components of the computing device 200 can be physically co-located, such as on a single chip. In such a case, some or all of the system bus 221 can be nothing more than silicon pathways within a single chip structure and its illustration in FIG. 2 can be nothing more than notational convenience for the purpose of illustration The computing device 200 also typically includes computer readable media, which can include any available media that can be accessed by computing device 200 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 200. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computing device 200, such as during start-up, is typically stored in ROM 231. RAM 232 typically contains data and/or program modules that are immediately accessible to and/or presently being operated on by processing unit 220. By way of example, and not limitation, FIG. 2 illustrates an operating system 234, other program modules 235, and program data 236.

The computing device 200 may also include other removable/non-removable, volatile/nonvolatile computer storage media. By way of example only, FIG. 2 illustrates a hard disk drive 241 that reads from or writes to non-removable, non-volatile magnetic media. Other removable/non-removable, volatile/nonvolatile computer storage media that can be used with the exemplary computing device include, but are not limited to, solid state storage devices, magnetic tape cassettes, flash memory cards, digital versatile disks, digital video tape, solid state RAM, solid state ROM, and the like.

The hard disk drive 241 is typically connected to the system bus 221 through a non-removable memory interface such as interface 240.

The drives and their associated computer storage media discussed above and illustrated in FIG. 2, provide storage of computer readable instructions, data structures, program modules and other data for the computing device 200. In FIG. 2, for example, hard disk drive 241 is illustrated as storing an operating system 244, other program modules 245, and program data 246. Note that these components can either be the same as or different from operating system 234, other program modules 235 and program data 236. Operating system 244, other program modules 245 and program data 246 are given different numbers here to illustrate that, at a minimum, they are different copies.

Of relevance to the descriptions below, the computing device 200 may operate in a networked environment using logical connections to one or more remote computers. For simplicity of illustration, the computing device 200 is shown in FIG. 2 to be connected to a network 190 that is not limited to any particular network or networking protocols. The logical connection depicted in FIG. 2 is a general network connection 271 that can be a local area network (LAN), a wide area network (WAN) or other network. The computing device 200 is connected to the general network connection 271 through a network interface or adapter 270 which is, in turn, connected to the system bus 221. In a networked environment, program modules depicted relative to the computing device 200, or portions or peripherals thereof, may be stored in the memory of one or more other computing devices that are communicatively coupled to the computing device 200 through the general network connection 271. It will be appreciated that the network connections shown are exemplary and other means of establishing a communications link between computing devices may be used.

Figure 3:
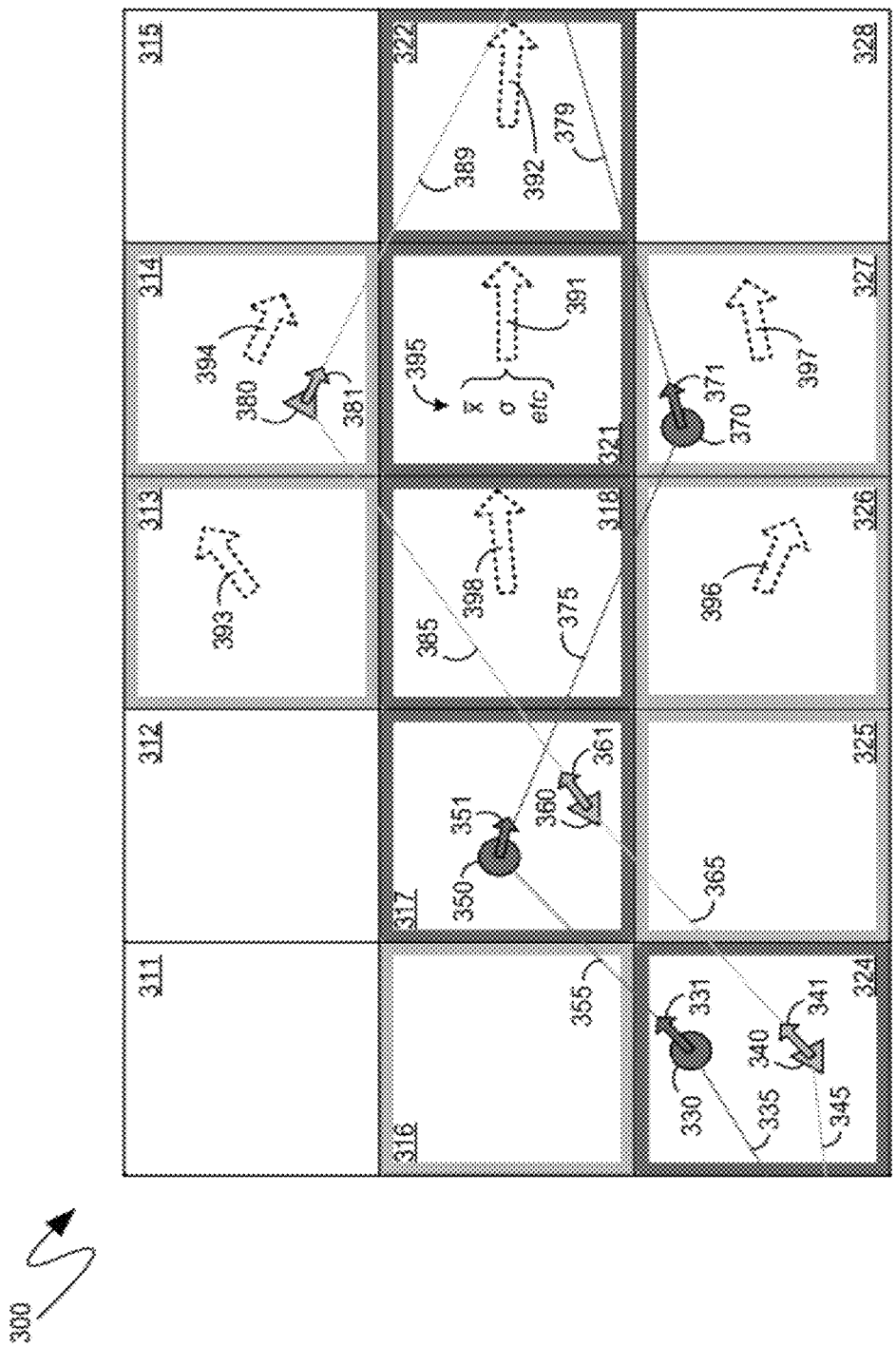
FIG. 3 is a block diagram of exemplary mechanisms for aggregating positional information.

Turning to FIG. 3, the grid 300 shown therein illustrates one exemplary mechanism by which multiple user trails can be aggregated into an aggregated trail. In particular, the grid 300 comprises two user trails, namely one user trail comprised of the location points 330, 350 and 370, and a second, distinct user trail comprised of the location points 340, 360 and 380. In one embodiment, to aggregate such user trails, a relevant area can be divided in the form of a grid, such as the grid 300, comprising individual grid cells 311, 312, 313, 314, 315, 316, 317, 318, 321, 322, 324, 325, 326, 327 and 328. Each individual grid cell can then have an indicator associated with it based on a quantity of user trails that pass through such a cell. For example, the grid cell 324 comprises a location point 330 of the trail of one computing device and a location point 340 of the trail of anther, different, computing device. Consequently, the grid cell 324 can be indicated, such as by a shading, a color, a textual indicator, or other like indicator, as having two user trails passing through it. In the grid 300 shown in FIG. 3, such an indication is shown in the form of a dark gray border around the cell 324. In a similar manner, the grid cell 317 can, likewise, be indicated as having two user trails passing through it on account of the location points 350 and 360 that are illustrated as falling within the grid cell 317. By contrast, the cell 314 can comprise only one location point, namely the location point 380. As a result, the cell 314 can be indicated by a different shading, color, textual indicator, or other like indicator. For example, in the grid 300, the cell 314 is shown as having a light gray border around it. In a similar manner, the cell 327 can, likewise, also have a light gray border around it because it comprises only one location point, namely the location point 370. In such a manner, multiple user trails can be aggregated with the resulting aggregation being in the form of a "heat map" image, with cells of the grid through which a greater number of user trails pass having a lighter, darker, or otherwise different or more intense indicator than those cells of the grid through which a fewer number of user trails pass. For example, in the exemplary grid 300 shown in FIG. 3, the cells having a greater number of user trails passing through them are illustrated in darker shading than those cells having fewer, or no, user trails passing through them.

In one embodiment, individual location points can have location segments extrapolated between them and the computing device that generated such location points can be assumed to have proceeded in a continuous manner from one location point to the next such that the computing device likely traveled along the extrapolated location segment. Consequently, for purposes of the indicators assigned to various grid cells, to indicate the quantity of user trails passing through those grid cells, a cell can be considered to have a user trail passing through it even if there is no location point associated with that user trail actually reported within the grid cell, so long as there is an extrapolated location segment passing through the grid cell. For example, in the exemplary grid 300 of FIG. 3, one user trail, the one comprising the location points 330, 350 and 370, can have extrapolated location segments 335, 355, 375 and 379 connecting those location points (and others not specifically shown within FIG. 3). Likewise, the other user trail, the one comprising the location points 340, 360 and 380, can have extrapolated location segments 345, 365, 385 and 389 connecting those location points (and others not specifically shown within FIG. 3). As can be seen from the grid 300 of FIG. 3, the grid cell 316 can have an extrapolated location segment 355 passing through it. As such, in one embodiment, the grid cell 316 can be considered to have one user trail passing through it, as a result of the location segment 355 passing through it. Consequently, the grid cell 316 can be indicated, such as by shading, color, textual indicator, or other like indicator, as a grid cell that has a single user trail passing through it. In the specific exemplary grid 300 shown in FIG. 3, the grid cell 316 is so indicated by having a light gray border around it. In a similar manner, the grid cell 325 can also be indicated with a light gray border on account of the extrapolated location segment 365 passing through it. Likewise, the grid cells 326 and 313 can also be indicated with a light gray border on account of the extrapolated segments 375 and 385, respectively. The grid cell 318, on the other hand, can be indicated as having two user trails passing through it, such as by a dark gray border, on account of the extrapolated location segments 375 and 385 passing through it. Grid cells 321 and 322 can, likewise, be indicated as having to user trails passing through them on account of the extrapolated location segments 379 and 389.

The remaining grid cells of the grid 300, namely grid cells 311, 312, 315 and 328 can remain unshaded as they can have no user trails passing through them. In such a manner, the grid 300 can represent an aggregation of multiple user trails. For example, the specific exemplary grid 300 shown in FIG. 3, by virtue of the shading applied to specific ones of the cells of the grid 300, based on the quantity of user trails passing through those cells, such as in the manner described in detail above, can represent an aggregation of multiple user trails in the form of a "heat map" or "intensity" image. More specifically, the grid 300 is shown greatly enlarged for purposes of illustration. Were each of the grid cells of the grid 300 substantially reduced, a dark gray line segment, comprising the cells 324, 317, 318, 321 and 322 would be more easily discernable, with some edges of that dark gray line segment blurring into the surrounding areas that have no shading via lightly shaded areas, such as those represented by cells 325, 326 and 327 below the dark gray line segment, and represented by cells 316, 313 and 314 above the dark gray line segment.

By aggregating many user trails, such as in the manner described in detail above, the individual aspects of any specific user trail can become lost and unrecoverable. Consequently, any personally identifiable information that can have been derived from a specific, single user trail can, by the aggregating of that user trail with other user trails, become lost and unrecoverable. In one embodiment, to provide for a sufficient level of anonymity, and a sufficient removal, or obfuscation, of personally identifiable information, aggregated trails can only be presented when a sufficient quantity of user trails has been aggregated into an aggregated trail. Thus, for example, for thoroughfares that experience a lot of traffic, aggregated trails can be generated and provided with the user trails collected over a relatively short period of time. However, for less traveled thoroughfares, such as those within residential neighborhoods, user trails branching off of, for example, a more heavily traveled thoroughfare, can become more easily identifiable. For example, a short thoroughfare ending in a cul-de-sac is likely to have only its residents traveling along it. Thus, at the intersection of that short thoroughfare with a main thoroughfare, the higher density of user trails that was aggregated along the main thoroughfare can decrease to only a handful of user trails can proceed along the short thoroughfare and into the cul-de-sac. Furthermore, many of those user trails can simply be repeated travels of a single individual. Thus, while an aggregated trail, corresponding to the main thoroughfare, can be generated with data collected over a relatively short period of time, an aggregated trail that sufficiently obfuscates personally identifiable information may require user trail data for such a shorter thoroughfare and for such a cul-de-sac to be collected over a substantially longer period of time a sufficient amount of user trails have been aggregated for that shorter thoroughfare and the cul-de-sac can have been collected. Consequently, in one embodiment, an aggregated trail for the shorter thoroughfare and the cul-de-sac can not be presented, and can be held back, until a sufficient quantity of user trails have been aggregated to provide for sufficient obfuscation of any personally identifiable information that could be derived therefrom. Alternatively, aggregated trails can be generated and then those portions of the aggregated trails which are comprised of an insufficient amount of user trails can be "pruned" such that they are not presented until a sufficient amount of user trails have been aggregated into them.

In another embodiment, the individual cells of a grid, such as the cells of the exemplary grid 300 shown in FIG. 3, can comprise more than just an indication of the quantity of user trails passing through those cells. For example, the individual cells of a grid can comprise not only an indication of the quantity of user trails passing through those cells, but also an average direction of travel, and an average rate of travel, along the user trails that pass through those cells. As will be recognized by those skilled in the art, user trails can comprise, not only coordinate information of individual location points, but also additional locational data associated with those individual location points, such as a direction of motion, and instantaneous rate of travel or speed, and other like locational data. For example, location data received from a computing device can not only indicate that the computing device was at the location point 330, but can also indicate that the computing device was at the location point 330 at a particular time, that it was traveling in a particular direction when it was at the location point 330, and that it had a particular speed or rate of change of position, when it was at the location point 330. To illustrate such an embodiment, the location point 330 is shown in the grid 300 of FIG. 3 as being associated with a vector 331 that indicates a direction of motion of a computing device at the location point 330 and that comprises an intensity representing the speed of the computing device in the indicated direction of motion at the location point 330. The other location points 350 and 370 of the same user trail as the location point 330 can, likewise, comprise associated vectors 351 and 371. Similarly, the location points 340, 360 and 380 of the second user trail shown in the grid 300 of FIG. 3 are also illustrated as having associated vectors 341, 361 and 381, respectively.

Such additional locational data can be incorporated by the aggregation mechanisms. To maintain simplicity of illustration, and for clarity of presentation, only the right-hand half of the cells of the grid 300 are shown in FIG. 3 as comprising additional locational information, such as is contemplated by the presently described embodiments. More specifically, and as shown, cells 313, 314, 318, 321, 322, 326 and 327 are illustrated as comprising not only an indicator, in the form of shading, that is associated with the quantity of user trails passing through those cells, but additionally a vector whose direction can represent an average direction of movement, and an average rate of movement, of the devices generating the user trails while those devices were in those cells. For example, as indicated previously, the cell 327 can comprise the location point 370 of one user trail and, as also indicated previously, the location point 370 can be associated with a vector 371, or similar data, that can indicate a direction in which the computing device was moving when it was at the location point 370, and the speed at which it was moving. The grid cell 327 can then, in addition to comprising an indication that one user trail passes through such a cell, also comprise an indication, such as in the form of the vector 397, that can represent an average direction of movement, and an average speed, for the computing devices whose user trails pass through the grid cell 327. Since the location point 370 can, in the exemplary grid 300 shown in FIG. 3, be the only location point in the grid cell 327, the vector 397 can have a direction and magnitude equivalent to the vector 371. In a similar manner, the grid cell 314 can comprise an indication, such as in the form of the vector 394, that can represent an average direction of movement, and an average speed, for the computing devices whose trails pass through the grid cell 314, and, since the grid cell 314, like the grid cell 327, comprises only one location point, namely the location point 380, the vector 394 can have a direction and magnitude equivalent to the vector 381 that is associated with the location point 380.

When extrapolating segments between the location points, the extrapolated segments can also comprise extrapolated direction, or extrapolated speed and direction, information. For example, the extrapolated segment 375, extrapolated between the location points 350 and 370, can have at least an extrapolated direction associated with it indicating a direction of movement along the extrapolated segment 375. Grid cell 326, therefore, having only extrapolated segment 375 passing through it, can have additional locational data associated with it, such as in the form of a vector 396 whose orientation can be equivalent to the extrapolated direction of movement along the extrapolated segment 375. Should an extrapolated speed also have been associated with the extrapolated segment 375, the vector 396 can have an intensity, or magnitude, equivalent to such a speed. Similarly, the grid cell 313, also comprising a single user trail in the form of the extrapolated segment 385, can have associated with it additional locational data in the form of a vector 393, whose orientation can be equivalent to the extrapolated direction of movement along the extrapolated segment 385.

For grid cells 318, 321 and 322, multiple user trails can pass through those grid cells and, consequently, any additional locational data associated with those cells can represent an averaging of the locational data of the individual user trails passing through those grid cells. For example, the grid cell 318 can have one user trail passing through it in the form of the extrapolated segment 375, which can have an extrapolated direction of motion associated with it and pointing, in the exemplary grid 300 of FIG. 3, in a direction towards the bottom right-hand corner of that Figure, while a second user trail passing through the grid cell 318, in the form of the extrapolated segment 385, can have an extrapolated direction of motion associated with it and pointing in the direction towards the upper right-hand corner of that figure. Consequently, averaging the extrapolated directions of motion provided by the extrapolated segments 375 and 385, the grid cell 318 can have associated with it a vector 398 that points approximately towards the right-hand side of the Figure, with possibly a slight upward deviation representing that the extrapolated direction of motion of the extrapolated segment 385 had a greater vertical component than the extrapolated direction of motion of the extrapolated segment 375. In a similar manner, the grid cell 322 can have associated with it a vector 392 that, again, points approximately towards the right-hand side of the Figure, representing an averaging of the two user trails passing through the grid cell 322, namely a first user trail in the form of the extrapolated segment 389, having associated with it an extrapolated direction of motion approximately towards the bottom right-hand corner of the Figure, and a second user trail in the form of the extrapolated segment 379, having associated with it an extrapolated direction of motion approximately towards the top right-hand corner of the Figure. The grid cell 321 can have associated with it a vector 392 generated in an analogous manner with respect to the extrapolated directional information associated with the extrapolated segments 379 and 389 that pass through the grid cell 321.

In one embodiment, the generation of the vectors, and other directional information associated with the individual grid cells, can be time dependent, or performed with reference to predefined time intervals. For example, user trails can be collected for a predefined time interval, such as a half-hour, or several hours, and the resulting directional information associated with individual grid cells can be recorded appropriately to reflect the time interval to which it applies. Such time intervals can be helpful in identifying traffic patterns, travel restrictions, opening and closing times, and other like time-dependent information. For example, if the factors described above are recorded with a time-dependent parameter, a thoroughfare could comprise an aggregated trail having average vectors, at individual grid cells, that points approximately in one direction for a given period of time, but then could comprise an aggregated trail having average vectors, at individual grid cells, pointing in approximately the opposite direction for a different period of time. In such an instance, an automated determination could be made that the thoroughfare corresponding to such aggregated trails is likely a thoroughfare with a reversible direction, for example allowing commuters into a city in the morning, and then back out of the city in the afternoon.

The directional information associated with individual grid cells can also be helpful, irrespective of whether it is recorded with time-dependent parameters, in identifying physical attributes of thoroughfares. For example, in a rural area for which other sources of information, such as high-resolution satellite imagery, are not available, it can be difficult to determine whether two thoroughfares that intersect one another do so at a level intersection, such that a turn could be made from one thoroughfare onto another, or intersect with one thoroughfare passing over the other one, such as via an overpass, thereby preventing traffic from turning from one thoroughfare on to the other. The directional information associated with individual cells, at the point of the intersection of the two thoroughfares, can be utilized to make an automated determination as to whether the two thoroughfares intersect at a level intersection or via an overpass, since such directional information would be different depending on whether users could, and actually did, turn from one thoroughfare onto another, or whether they were physically unable to do so.

In a further embodiment, rather than maintaining only an average direction of motion and magnitude, such as in the form of an average speed measurement, the individual grid cells can have associated with them more detailed directional information including, for example, mean, median, standard deviation and other like quantifiers of the statistical distribution of direction and magnitude of motion of the user trails passing through those individual grid cells. Additionally, or alternatively, the more detailed directional information can comprise information such as the 10% fastest speeds recorded through a particular grid cell, or other like statistical outlier information. To illustrate such an embodiment, the vector 391 that is associated with the grid cell 321 is shown as having associated with it a series of statistical values 395 representing the richer statistical information that can be maintained on a per-cell basis. Additionally, as described in detail above, such richer statistical information can be retained on a time-dependent basis, such that statistical information corresponding to given periods of time can be obtained independently from statistical information corresponding to other periods of time.

In one embodiment, the richer statistical information can reveal multiple groupings of data. For example, the statistical distribution can reveal two peaks of values, which can indicate that more than one road, for example, passes through a single cell. While the cell size can be selected to minimize such a possibility, the present embodiment contemplates maintaining multiple aggregated values to account for such a possibility. Statistical methods, such as known particle filtering methodologies can be utilized to analyze the user trail data and determine whether and within which cells to maintain multiple aggregated values or multiple sets of richer statistical information.

Such richer statistical information can enable further automated determinations that can aid in the generation of maps with greater details. For example, richer statistical information can reveal, for a grid cell within which two thoroughfares intersect, that the distribution of directions of motion of user trails through that cell for one period of time indicates a collection of user trails that continue through the cell along a single thoroughfare and a smaller collection of user trails that turn left from one thoroughfare onto another, while, for a different period of time, the distribution of directions of motion indicate that there are no user trails that turn left. From such information an automated determination can be made that there is a time-dependent turn restriction imposed at the intersection of the two thoroughfares within that grid cell. Further processing, such as by communicating with the municipality within which that intersection is based, can reveal the precise time constraints on such a turn restriction.

In one embodiment, the richer statistical information described above can be maintained only for particular grid cells, such as, for example, grid cells within which two or more thoroughfares intersect. Such grid cells can maintain, in addition to the directional information referenced above, a histogram of measured directions of motion along user trails through those cells. By limiting the derivation and maintenance of certain types of information to only selected grid cells, the amount of processing and storage space required can be reduced while still retaining information within those cells where such information can be useful.

The above described aggregations can, in one embodiment, be performed in parallel, or can otherwise be broken down into further subsets. For example, user trails generated by men between the ages of 18 and 39 can be processed, and aggregated, independently of the user trails generated by women above the age of 65. Such aggregated trails can, assuming a sufficient amount of individual user trails such that personally identifiable information is sufficiently obfuscated, be made available independently of one another. Subsequent processing, such as by a third-party computing device, can then aggregate such already aggregated trails to generate an omnibus aggregated trail comprising, for example, all of the user trails through a given area irrespective of the age, gender, or other like qualifiers by which such aggregated trails could have been divided when, for example, presented to the third-party computing device.

While the above descriptions have been provided within the context of positional information, such as speed, direction, acceleration and the like, user trails can comprise further, non-positional, information that can enable the division of the aggregation of user trails. For example, as indicated previously, user trails can contain age and sex information, such as information that can have been entered by a user into a mobile computing device that is providing the user trail. Additionally, user trails can comprise information that can be utilized to categorize the travel-centric aspects of the user. For example, a mobile computing device providing a user trail can indicate a residence zip code of the user, thereby enabling a determination of whether the user is a "local" or a "tourist". Such information could also be derived from an analysis of unique identifiers provided by the computing devices from which the trails are received. For example, if a lot of received user trails comprise a particular device identifier, the user generating those trails can be classified as a "local", which a device identifier that was not previously received can be assumed to come from a "tourist" user.

In another embodiment, user trails can be filtered according to directional ranges, or other like positional attributes, prior to aggregation. For example, for grid cells where two or more thoroughfares intersect, averaging all of the user trails in those cells can provide sub-optimal directional data, since one collection of user trails will be substantially oriented in one direction and another collection of user trails will be substantially oriented in another direction substantially orthogonal to the first direction. Consequently, user trails can be filtered prior to aggregation by first aggregating user trails whose direction of motion comprises, for example, a range between zero and 45° and then aggregating user trails whose direction of motion comprises, for example, the range between 45° and 90°.

To further remove personally identifiable information, random noise can be applied to user trails prior to their aggregation since, as will be recognized by those skilled in the art, such noise can cancel itself out via the aggregation process, resulting in aggregated trails that are not statistically different from aggregated trails to which no noise was applied. For example, the timestamps associated with location points can be randomly varied, with an equal random variation being applied to the timestamps of all of the location points associated with a single user trail. Such time variation is unlikely to impact automated processing, such as that described in detail above, since such automated processing relies on time differences, as opposed to specific times. For example, the above described automated processing can identify a potential turn restriction imposed on an intersection based only on differences over a period of time, rather than on the absolute times at which such differences occur. As indicated previously, the specific times at which such a turn restriction can be implemented can be obtained, such as from a municipality, once automated processing has already identified an intersection as having a turn restriction. In one embodiment, the amount of random noise that can be applied to user trails can be inversely proportional to the quantity of user trails available, such that regions with substantial user traffic may not need to have any randomized noise applied to such user trails to further obfuscate personally identifiable information, while regions with less user traffic may need to have more random noise applied to user trails to remove personally identifiable information.

Figure 4:
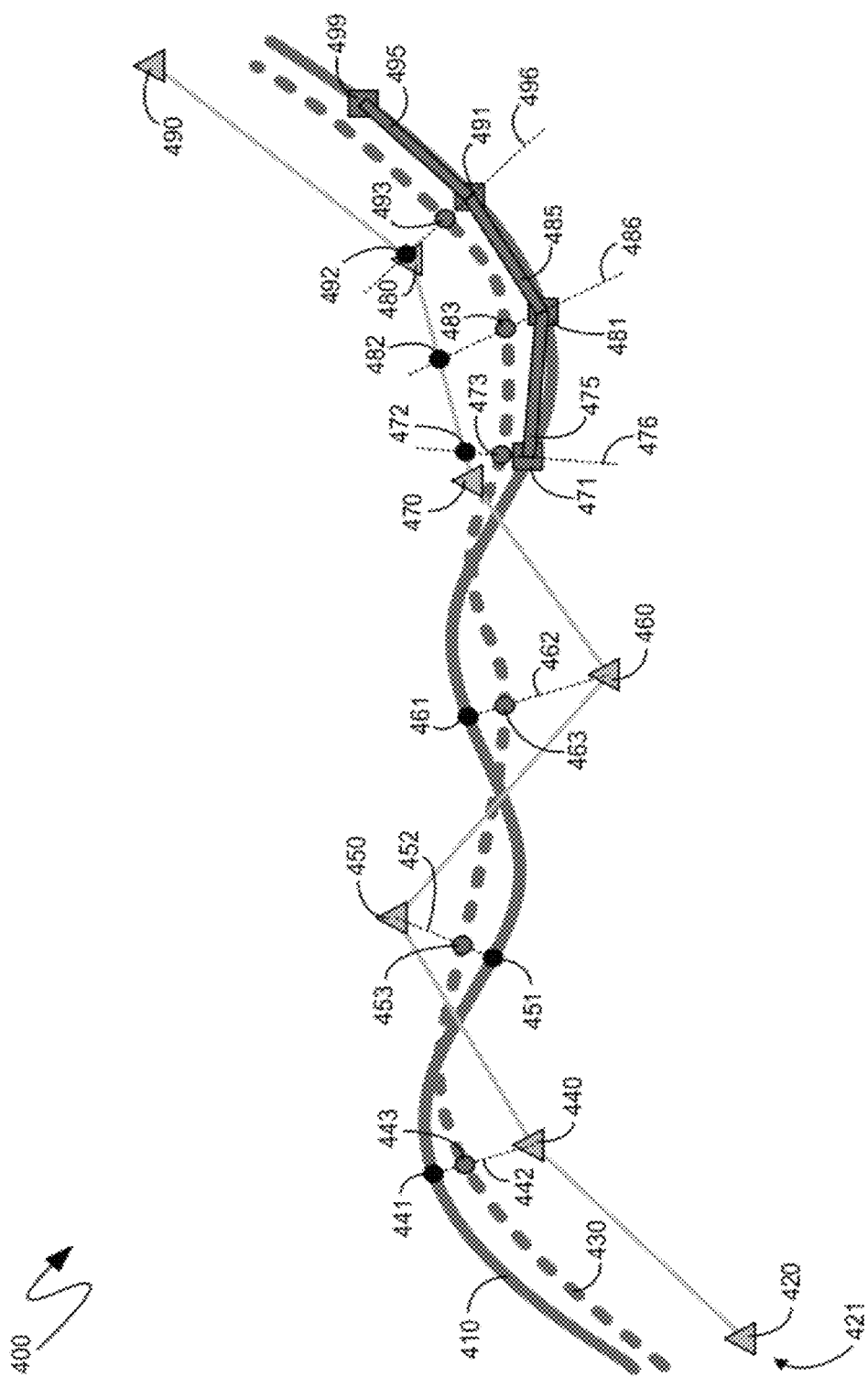
FIG. 4 is a block diagram of further exemplary mechanisms for aggregating positional information.

Turning to FIG. 4, the system 400 shown therein illustrates other exemplary mechanisms by which user trails can be aggregated into an aggregated trail. More specifically, individual user trails, such as the user trail 421 that is comprised of the location points 420, 440, 450, 460, 470, 480 and 490, can be aggregated into an already aggregated trail, such as the aggregated trail 410. Such an aggregation can be considered a one-dimensional aggregation, since individual user trails can be aggregated into an aggregated trail in the form of a one-dimensional line.

In one embodiment, an aggregation of an existing user trail into an aggregated trail can be performed by identifying points along the aggregated trail 410 that are closest to the location points of the user trail 421 being aggregated into it. For example, as shown by the system 400 of FIG. 4, a point 441 on the aggregated trail 410 can be determined to be closest to the location point 440 of the user trail 421 that is being aggregated into the aggregated trail 410. A segment 442 can extend from the location point 440 on the user trail to the point 441, on the aggregated trail 410, which has been determined to be closest to the location point 440. A weighted average can then be applied along the segment 442 to determine a new point 443, along that segment, through which the aggregated trail 430, now including the user trail 421, is to pass. In one embodiment, the weighting applied in performing the weighted average can be such that the user trail 421 is assigned a unitary weighting, while the aggregated trail 410 is assigned a weighting to measure with the quantity of user trails already aggregated into the aggregated trail 410 or otherwise a substantially higher weighting than the user trail 421. Thus, in the system 400 of FIG. 4, the new point 443 is shown as being closer to the aggregated trail 410 than it is to the user trail 421 since, as will be recognized by those skilled in the art, when applying a weighted average, the aggregated trail 410 can carry a substantially higher weight than the user trail 421.

In a similar manner, for the location point 450 of the user trail 421, a point 451 on the aggregated trail 410 can be determined as being closest to the location point 450. A segment 452 can then be generated between the point 451 on the aggregated trail 410 and the location point 450 of the user trail 421, and a weighted average along the segment 452 can result in the determination of a new point 453 through which the new aggregated trail 430, now comprising the user trail 421, is to pass. Similarly, for the location point 460, a point 461 on the aggregated trail 410 can be identified as closest, a segment 462 can be generated between the point 461 and the location point 460, and a weighted average along the segment 462 can generate a new point 463 through which the new aggregated trail 430 can pass.

In another embodiment, the aggregated trail 410, into which the user trail 421 is being aggregated, can be tessellated into smaller segments having endpoints on the aggregated trail 410. For example, as shown in the system 400 of FIG. 4, the aggregated trail 410 can be tessellated into segments 475, 485 and 495 by dividing the aggregated trail 410 at the points 471, 481, 491 and 499. At each of the endpoints, a segment orthogonal to the tessellated segment proceeding from that endpoint can be established such that, between the tessellated segment proceeding from that endpoint and the orthogonal segment, a coordinate system can be established along those two axes.

For example, at the point 471, a tessellated segment 475, representing a tessellated portion of the aggregated trail 410, can proceed from the point 471 to the next point on the aggregated trail 410, namely the point 481. A segment 476 can be established at the point 471 in a direction orthogonal to the tessellated segment 475. Consequently, at the point 471, the tessellated segment 475 and the segment 476 can establish a coordinate system having those two segments as axis. The orthogonal segment 476 can intersect the user trail 421, which is to be aggregated into the aggregated trail 410 at a point 472, on an extrapolated segment of the user trail between the location points 470 and 480 of the user trail 421. A weighted average between the point 471 and the point 472 along the segment 476 can be computed, deriving a new point 473 through which the new aggregated trail 430, now comprising the user trail 421, is to pass. As before, in one embodiment, the weighted average can be computed based on the user trail 421 having a unitary weighting and the aggregated trail 410 having a weighting commensurate with the quantity of user trails that have already been aggregated into it, or otherwise a substantially higher weighting than the user trail 421. Thus, as before, the averaged new point 473 is shown as being closer, along the segment of 476, to the point 471, on the aggregated trail 410, than it is to the point 472, on the user trail 421.

In a similar manner, at the point 481, on the aggregated trail 410, a segment 486 can be established in a direction orthogonal to the tessellated segment 485 that proceeds from the point 481. As before, the tessellated segment 485 and the orthogonal segment 486 can establish two axis of a coordinate system at the point 481. The orthogonal segment 486 can then intersect an extrapolated segment of the user trail 421, extrapolated between the points 470 and 480, at the point 482. A weighted average between the point 482 and the point 481 can then be computed along the orthogonal segment 486, resulting in a new point 483 through which the new aggregated trail 430 can pass. Similarly, at the point 491, a segment 496 can be established orthogonal to the tessellated segment 495 that proceeds from the point 491. A point 492 can be the intersection of the orthogonal segment 496 with the user trail 421, namely on an extrapolated segment of the user trail 421 between the location points 480 and 490. As before, then, a weighted average along the orthogonal segment 496 can be computed resulting in a new point 493 that is between the point 492, on the user trail 421, and point 491, on the aggregated trail 410. The new aggregated trail 430 can then be rerouted to pass through the averaged new point 493.

In such a manner an existing user trail, such as the user trail 421, can be aggregated into an already aggregated trail, such as the aggregated trail 410, to generate a new aggregated trail 430, now comprising the user trail 421. While the system 400 of FIG. 4 illustrates two different mechanisms being utilized to aggregate a single user trail, such as the user trail 421, into an already aggregated set of user trails, such as the aggregated trail 410, such an illustration is strictly for clarity and efficiency of presentation. In implementation, it is likely that one mechanism will be consistently applied to all of a single user trail.

In one embodiment, the aggregation of user trails, such as that described in detail above with reference to the system 400 of FIG. 4, can be performed in parallel. More specifically, collections of user trails can be aggregated into intermediate aggregated trails. The intermediate aggregated trails can then be further aggregated together to generate ultimate aggregated trails. As will be recognized by those skilled in the art, the generation of intermediate aggregated trails can be performed in parallel as self-contained computational problems.

The aggregation of user trails has been described in detail above with reference to both a grid structure and a line structure. In other embodiments, however, other structures can be utilized to represent and quantize the aggregated user trails. For example, the above-described mechanisms can be applied, in a straightforward manner, to any type of planar or volumetric tessellations, in addition to the regular grid described. Indeed, the above-described mechanisms can be applied in a similar fashion to triangular meshes, to hierarchical tessellations, such as a quad tree, or any other tessellation that can be utilized to represent road structures or other like user trail structures.

As indicated previously, personally identifiable information may be able to still be obtained from aggregations of user trails if an insufficient quantity of individual user trails is aggregated. Thus, the aggregation mechanisms described above in reference to the system 400 of FIG. 4 can, like the mechanisms previously described, remove those portions of user trails that proceed through an area where there are an insufficient number of individual user trails such that, when aggregated, personally identifiable information may still be able to be derived from such aggregated user trails.

In one embodiment, to further remove personally identifiable information, and, more specifically, to further obfuscate data from which personally identifiable information can be derived, the above described aggregated trails can be processed further. One such further processing can be a re-resolution of the aggregated trails produced by the above-described methods. For example, and with reference to the aggregation method described above with reference to FIG. 3, a grid representing an aggregated set of user trails can have a particular resolution defined by the size of the individual grid cells. Prior to presenting such a aggregated trail, such as to a third party, the resolution of the grid can be decreased, such as, for example, by grouping a 2×2 combinations of grid cells and then averaging them to generate a new, low-resolution, grid comprising grid cells of four times the size of the original grid cells. In one embodiment, known image processing techniques can be utilized to perform such a re-resolution.

Another further processing can be a resampling of a line, such that which would be generated by the mechanisms described in detail above with reference to FIG. 4. An aggregated trail can be resampled, such as by generating a segmented polynomial that can imitate the geometry of the original line. More specifically, the aggregated trail can first be represented as a parametric polyline, thereby allowing the specification of any point along the parametric polyline. Subsequently a uniform sequence multiple parameter values can be selected, to select points along the parametric polyline. At each point, segments connecting the points can then be generated, as can segments orthogonal to those connecting segments. As described above, the orthogonal segments can intersect with the existing aggregated line and a weighted average between the existing aggregated line and the segments can be generated to define a newly resampled line, such as in the manner described above.

However, in certain cases, personally identifiable information may be able to still be obtained from aggregations of user trails even after such re-resolution and resampling techniques have been applied. In those situations, various mechanisms can be implemented to further obfuscate personally identifiable information, rendering it that much more difficult to derive the personally identifiable information from aggregated trails that can be provided, such as to third parties. Typically, the mechanisms implemented to further obfuscate personally identifiable information can be implemented on an individual-user-trail-basis, such that, after they are implemented, the modified user trails can be re-aggregated into aggregated trails. Thus, in one embodiment, one or more of these obfuscation mechanisms can be applied prior to the aggregation of user trails, while, in another embodiment, user trails can be aggregated first and then, if such aggregation is insufficient to properly remove personally identifiable information, the individual user trails can have obfuscation mechanisms applied to them, and the aggregation can be performed a subsequent time. In yet another embodiment obfuscation mechanisms can be selectively applied based on predictive assessments of the aggregation, such as based on predictions as to whether a sufficient quantity of user trails exists to be aggregated so as to properly remove personally identifiable information.

Figure 5:
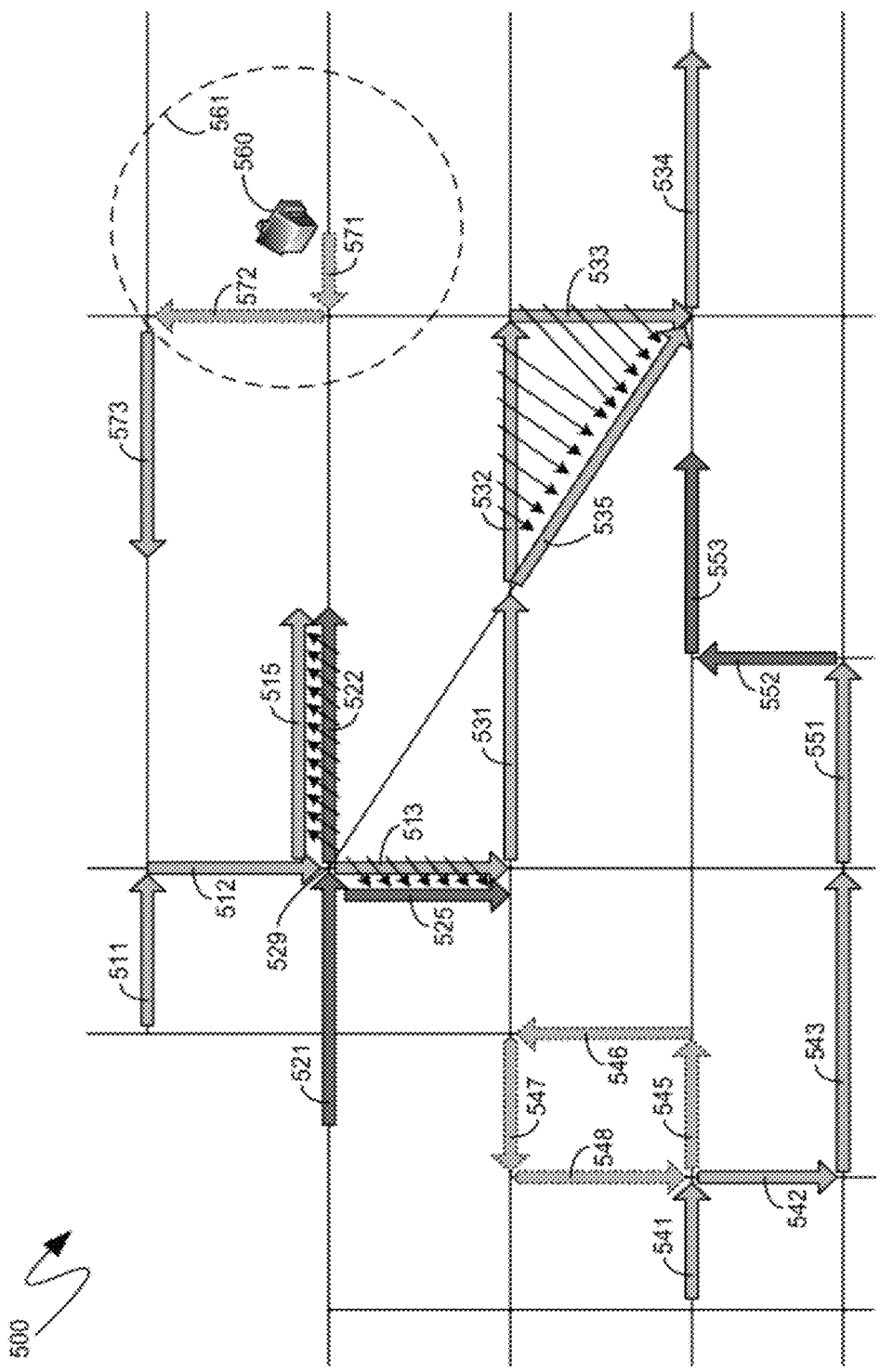
FIG. 5 is a block diagram of exemplary mechanisms for obfuscating personally identifiable information.

Turning to FIG. 5, the system 500 shown therein illustrates an exemplary set of mechanisms that can be applied to individual user trails, either individually or in combination, that can serve to further obfuscate personally identifiable information inherent in those user trails. One such mechanism can be the exchanging of identities when user trails cross one another. For example, and as illustrated by the system 500 of FIG. 5, one computing device, whose trail is represented by light gray shading, can move along a path identified by the segments 511, 512 and 513. Another, different, computing device, whose trail is represented by dark gray shading, can move along the path identified by the segments 521 and 522. As can be seen, the paths of these two computing devices intersect at the intersection 529. Thus, in one embodiment, such an intersection can be utilized to obfuscate personally identifiable information while still retaining the sort of user trail data that would be relevant to, for example, mapping purposes. More specifically, and as illustrated by the arrows in FIG. 5, the segment 522 can be changed to the segment 515, such that the segment 515 indicates a computing device traveling along the same path as was indicated by the segment 522, except that the identifier of the computing device is changed to match that of the computing device that traveled along the segments 511 and 512. Similarly, and is also illustrated by the arrows in FIG. 5, the segment 513 can be changed to the segment 525, such that the segment 525 indicates a computing device traveling along the same path as was indicated by the segment 513, except that the identifier of the computing device is changed to match that of the computing device that traveled along the segment 521. In aggregate, as will be recognized by those skilled in the art, such a change can make no difference. Specifically, both before and after the change, one computing device arrived at the intersection 529 from the top of FIG. 5 and one computing device departed from the intersection 529 towards the bottom of FIG. 5. Similarly, both before and after the change, one computing device arrived at the intersection 529 from the left-hand side of FIG. 5 and one computing device departed from the intersection 529 towards the right hand side of FIG. 5. However, for purposes of attempting to derive personally identifiable information, it now appears as if one user traveled along the segment 521 and then turned to travel along the segment 525, while another, different, user traveled along the segments 511 and 512 and then turned to travel along segment 515. As will be recognized by those skilled in the art, it can be much more difficult to correlate such individual user trails, even if they could be derived back out of any aggregated user trail, to identify a particular user, since no human user, in fact, traveled along such paths.

In another embodiment, a mechanism that can be utilized to further obfuscate personally identifiable information can be the changing of user trails by any manner that does not substantially impact the usefulness of underlying data. For example, a user trail, as shown by the system 500 of FIG. 5, can be comprised of the segments 531, 532, 533 and 534. However, information can be received, or can otherwise be known, that the segments 532 and 533 of that user trail are along thoroughfares for which no further information is needed, such as, for example, thoroughfares that are well known. In such a case, since only the segments 531 and 534 can be providing the desired information, the user trail can be modified, as illustrated by the arrows shown in FIG. 5, to replace the segments 532 and 533 with an equivalent segment 535, or any other equivalent set of segments that, like the equivalent segment 535, also travel along thoroughfares for which no further information is desired or requested. Again, even if an individual user trail were able to be derived back out of any aggregated user trails that were provided, such an individual user trail would now indicate the user trail comprising the segments 531, 535 and 534 from which personally identifiable information can be very difficult to obtain since no human user, in fact, traveled along such a route.

In an analogous embodiment, rather than replacing particular segments, such as the segments 532 and 533, of a user trail, particular turns in a user trail can be replaced with equivalent turns or sequences of turns. For purposes of the descriptions herein, a "turn" can be identified from the individual location points that comprise a user trail by identifying a set of points such that the location points at the beginning of that set lie substantially along one line and the location points at the end of that set lie substantially along another line that intersects the first line at an angle greater than a threshold angle along the direction of motion indicated by the timestamps associated with the individual location points. In one embodiment, the threshold angle can be defined as approximately 90°, while in another embodiment it can be defined as greater than approximately 45°. Other threshold angles can, likewise, be defined. Referring back to the system 500 of FIG. 5, for example, a user trail comprising the segments 541, 542 and 543 can include a right turn between the segments 541 and 542. In one embodiment, personally identifiable information can be further obfuscated by modifying such a user trail to replace that right turn between the segments 541 and 542 with a series of left-hand turns, such as along the segments 545, 546, 547 and 548, as illustrated by FIG. 5. Again, since no human user, in fact, traveled along such a route, it can be difficult to obtain any personally identifiable information from such a route, even if the individual user trail were able to be obtained from provided aggregated trails. As before, however, in one embodiment, such a replacing of one turn with an equivalent sequence of turns can be performed only for areas for which it is known, or for which a specification has been received that indicates, that those areas are not of interest. Thus, for example, the segments 541, 542, 545, 546, 547 and 548 can all represent travel along a downtown area for which no further information is requested and, as such, only the segment 543 can be significant. However, even if the user trail illustrated in FIG. 5 is the only user trail comprising the segment 543, changing that user trail to comprise the segments 545, 546, 547 and 548 can obfuscate personally identifiable information that could otherwise be gleaned from such a user trail.

More globally, an area comprising multiple thoroughfares can be marked, or identified, as an area within which user trails are not desired. Alternatively, an area can be marked, or indicated, as an area within which user trails are desired and all other areas can be treated as areas within which user trails are not desired, unless specified otherwise. For example, a downtown area can have well-defined thoroughfares whose locations, restrictions and other properties are well known. In such a case, the user trails outside of such an area can be the user trails that are desired. Consequently, the area within which user trails are not desired, such as the exemplary downtown area, can be treated as a "black box" such that user trails entering and leaving the downtown area can remain unchanged, but within the downtown area such user trails can be "scrambled" thereby rendering it more difficult to identify a single trail through a downtown area and, consequently, rendering it more difficult to obtain any personally identifiable information therefrom. As utilized herein, the term "scrambling" means the substitution, modification or deletion of the portions of a user trail within a defined region limited by the requirement that the user trail still enter and leave the defined region in the same manner, and at the same location, both before and after the scrambling. Such a scrambling of user trails can be performed by any of the mechanisms described herein, either alone or in combination, and can further involve wholesale modification such that, within the identified area, there can exist even aggregate differences before and after the scrambling.

In another embodiment, virtual user identities can be created such that a single user trail can be divided into two or more user trails even though, in reality, a single user or, more precisely, a single computing device, created the entire trail. For example, and with reference to the system 500 of FIG. 5, a single user trail, such as the single user trail comprising the segments 551, 552 and 553, can be divided into "sub-trails". Thus, for purposes of obfuscating personally identifiable information, segments 552 and 553 can be part of one "sub-trail" and segment 551 can be part of another "sub-trail". The segments 552 and 553 can then be assigned identifiers such that they represent another, different, user trail even though they are, in reality, part of a trail made by a single user, or, more precisely, a single computing device likely co-located with that user. For example, the user trail comprising the segments 551, 552 and 553 can be found to be "too long" and, as such, can be divided into to sub-trails, such as in the manner described. In one embodiment, a determination of a maximum length of a user trail can be based on tunable parameters. As will be recognized by those skilled in the art, the differences introduced by adding virtual user identities and, thereby, splitting a single user trail into multiple user sub-trails can not have an impact when aggregating the user trails. However, it can serve to further obfuscate, and thereby further remove, personally identifiable information.

Such a splitting of the single-user trail into multiple user sub-trails can be performed so as to render it more difficult to recombine the split trails into the original user trail and, thereby, derive personally identifiable information therefrom. One mechanism that can be implemented to make such recombination more difficult can be to select a location at which to split the user trail based on decisions that a user makes while traveling along the trail, such as, for example, when the user turns. Thus, in the example illustrated in FIG. 5, the user trail comprising the segments 551, 552 and 553 can be split when the user turned from the thoroughfare along the segment 551 onto the thoroughfare along the segment 552. Another mechanism that can be implemented to make such recombination more difficult is to split a single user trail into multiple fractions, or sub-trails, thereof, and then discard selected ones of those fractions or sub-trails. Thus, for example, with reference to the system 500 of FIG. 5, the user trail comprising the segments 551, 552 and 553 can have been split so that each segment became its own sub-trail and was associated with a different user, and then one of the segments such as, for example, segment 552, can simply have been discarded.

Multiple user sub-trails that have been split from a single user trail can also be recombined by reference to the timestamps present in the location points that comprise the sub-trails. In one embodiment, to prevent recombination based on timestamps, each new sub-trail that is split from an existing trail can have the timestamps of its location points recalibrated to start, for example, on the nearest hour. Thus, for example, and with reference to the system 500 of FIG. 5, when the segments 552 and 553 are split from their original user trail, such as by identifying them as being associated with a different computing device, and thus becoming a different sub-trail, and the timestamp of the first location point in the segment 552 can be rounded up to the nearest hour and each location point subsequent to that one, in the segments 552 and 553, can be adjusted accordingly to maintain the same, existing differences between the timestamps.

In another embodiment, specific locations can be identified as being particularly useful to the derivation of personally identifiable information and, as such, user trails around those locations can simply be discarded, or not used. Alternatively, user trails can have a greater amount of noise, such as previously described in detail, added to them within defined regions around such specific locations. The system 500 of FIG. 5 comprises a user's home 560 that can be, for example, in a sparsely populated area. As such, any user trail originating or ending at the user's home 560 is likely to be linked to that user and, thereby, can reveal personally identifiable information, such as when the user leaves their home. Consequently, in one embodiment, an area 561 can be established around the user's home 560 such that any user trails within that area can be cropped or deleted. For example, the user trail comprising the segments 571, 572 and 573 can be cropped to remove the segments 571 and 572 that are within the area 561 around the user's home 560. With reference to personally identifiable information, therefore, such a user trail will not be evident until the segment 573 that can be, for example, on a primary thoroughfare and, as such, may not link that user with the individual that lives in the home 560, thereby removing that personally identifiable information.

While the above example was described with reference to a user's home, other like locations can similarly be identified as being particularly useful to the derivation of personally identifiable information and, as such, can have boundaries set up around them within which user trails can be cropped, deleted or can have additional or greater amounts of noise added to them. For example, small businesses having only a few employees can likewise be identified. In one embodiment, particularly sensitive locations can also be identified and can have boundaries set up around them within which user trails can be cropped, deleted or have additional noise added to them. Such particularly sensitive locations can include abortion clinics, legalized brothels, and other areas that users visiting those areas would be particularly sensitive to alerting others to their visits thereto. Such sensitive locations can be identified manually, or they can be identified empirically based upon existing user data. For example, existing location data can indicate that users typically deactivate their cellular telephone computing devices, personal navigation computing devices, in-vehicle navigation computing devices and other like devices that could record that user's location when they approach such sensitive areas, thereby providing empirical evidence that users associate such areas with the desire for secrecy or privacy. Additionally, the boundary established around sensitive areas or areas identified as being particularly useful to the derivation of personally identifiable information can vary based on factors including, for example, the quantity of user trails passing through such an area, with a greater quantity of user trails signifying a lesser need for such boundaries.

Additional mechanisms to those described in detail above can likewise be utilized to further obfuscate personally identifiable information without modifying the user trails in a manner that would negatively impact them, given their intended use. For example, user trails could be matched to segments of an existing aggregation or an existing road map. Each part of the trail can then be represented as an index of such a matched segment. Such a mechanism can be utilized to remove inherent information, such as a driving style, that can be utilized to reconnect otherwise disjointed parts of a larger user itinerary.

Figure 6:
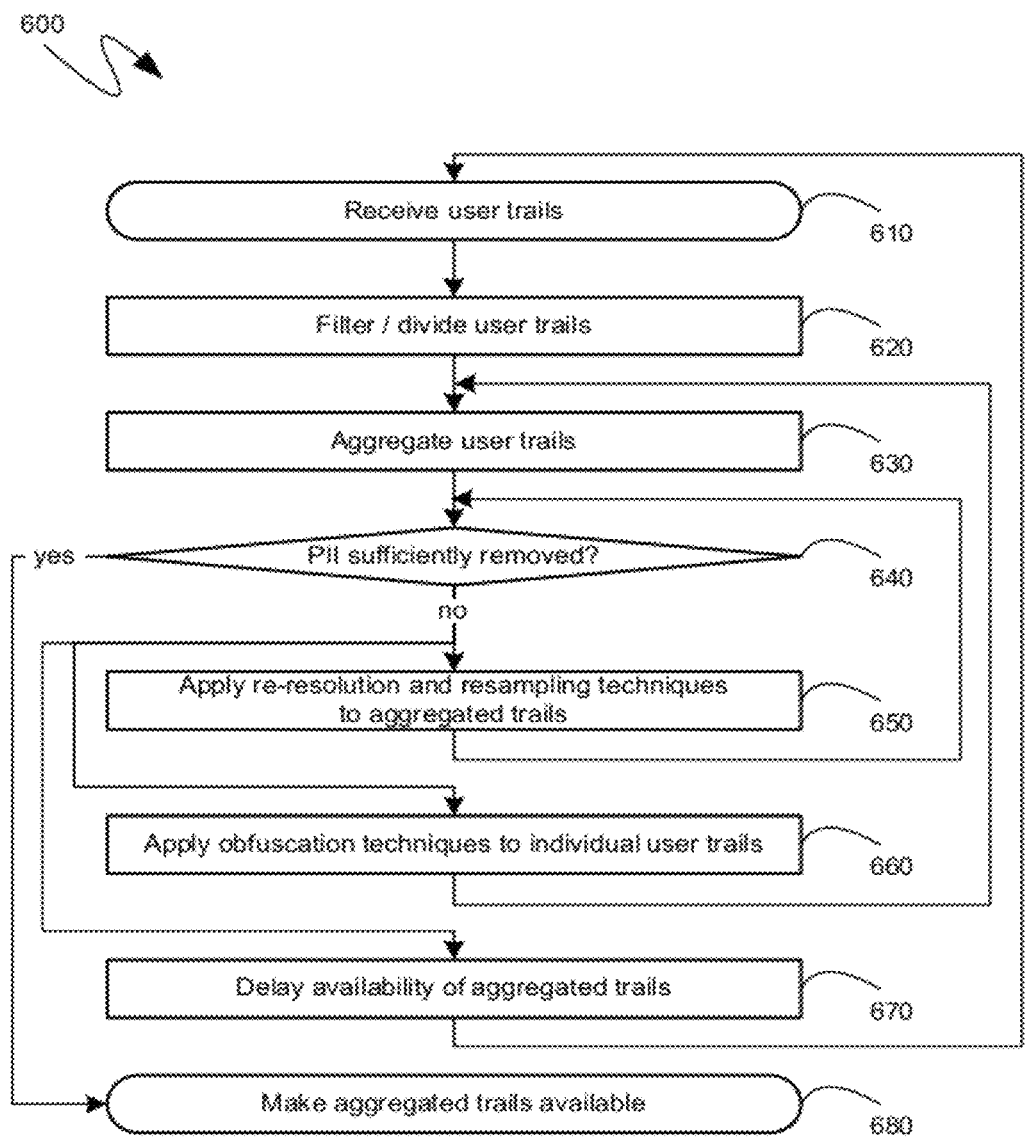
FIG. 6 is a flow diagram of an exemplary mechanism for providing aggregated positional information without personally identifiable information.

Turning to FIG. 6, the flow diagram 600 shown therein illustrates an exemplary series of steps by which the above-described mechanisms can be implemented to provide aggregated trails without personally identifiable information. Initially, at step 610, user trails can be received. As indicated previously, such user trails can be received from a myriad of computing devices and a wide variety of sources. In one embodiment, although not specifically illustrated by the steps of the flow diagram 600 of FIG. 6, the received user trails can be stored, such as for subsequent processing.

Subsequently, at step 620 the user trails can be filtered or divided, such as in accordance with the mechanisms described in detail above. For example, as described above, user trails can be filtered based on a direction of motion, such as for better handling of intersections and other like areas where different groups of users will be proceeding in different directions. As another example, as also described above, user trails can be divided based on the types of users that were creating those trails, such as, for example, based on the user's gender, age, marital status, and other like determinant factors. At step 630, the user trails can be aggregated to form aggregated trails, such as by utilizing the mechanisms described in detail above. As indicated previously, the aggregation of user trails, at step 630, can be performed in parallel, including being performed in parallel across multiple virtual or physical computing devices.

Once aggregated trails have been generated at step 630, processing can proceed to step 640, at which point a determination can be made as to whether personally identifiable information has been sufficiently removed. Although illustrated as a separate, discrete step, step 640 can be integrated into step 630 so as to avoid wasting computational resources aggregating user trails when it can be determined in advance that personally identifiable information is not likely to be sufficiently removed, such as, for example, because there are simply too few user trails. If, at step 640, it is determined that personally identifiable information has been sufficiently removed, the aggregated trails can be made available, such as to third parties, at step 680.

Alternatively, if, at step 640, it is determined that additional processing is required to sufficiently remove personally identifiable information, one or more of the steps 650, 660 and 670 can be selected. For example, at step 650, the existing aggregated trails that were generated at step 630 can be resampled or have their resolution changed, such as in the manner described in detail above, to obfuscate details, thereby rendering the derivation of personally identifiable information more difficult. Processing can then return to step 640 to determine if personally identifiable information has been sufficiently removed by the techniques applied at step 650. Alternatively, or in addition, at step 660, one or more of the obfuscation techniques described in detail above can be applied to individual user trails including, for example, swapping portions of intersecting user trails, splitting user trails, modifying user trails within identified regions, substituting segments of user trails with equivalent segments, replacing turns in user trails with equivalent sequences of turns, proving or deleting user trails within regions around identified locations and other like obfuscation techniques. Processing can then return to step 630, at which point the user trails that were modified at step 660 can be aggregated. As yet another alternative, at step 670, availability of the aggregated trails can be delayed until a sufficient quantity of user trails has been received such that an aggregation of all those user trails can sufficiently remove personally identifiable information. Processing can then return to step 610 to receive the additional user trails.

As can be seen from the above descriptions, Mechanisms for removing personally identifiable information from user trail data have been presented. In view of the many possible variations of the subject matter described herein, we claim as our invention all such embodiments as may come within the scope of the following claims and equivalents thereto.

We claim:

1. One or more computer-readable memory comprising computer-executable instructions for removing personally identifiable information from user trails, the computer-executable instructions directed to steps comprising:

receiving a first user trail comprising a first set of discrete locations of a first computing device, the first user trail having personally identifiable information;

modifying the first user trail to generate a new first user trail without the personally identifiable information by removing the personally identifiable information by performing at least one of:

replacing a turn in the first user trail with a sequence of equivalent turns, each of which differs from the identified turn, the sequence of equivalent turns having, in aggregate, a same starting point as the replaced turn and a same ending point as the replaced turn;

replacing at least one segment of the first user trail, the at least one segment being less than the whole first user trail, with one or more segments differing from the replaced at least one segment, the one or more segments having a same starting point as the replaced at least one segment and a same ending point as the replaced at least one segment;

dividing the first user trail into two or more sub-trails and identifying at least one of the two or more sub-trails as having been generated by a different computing device; and exchanging a portion of the first user trail with a portion of a second user trail intersecting with the first user trail, the exchanged portions of the first and second user trails having the intersection as an endpoint.

2. The computer-readable memory of claim 1, wherein the computer-executable instructions for modifying the first user trail further comprise computer-executable instructions for pruning the first user trail to remove trail segments within a predefined region around at least one of: a sensitive location and a location particularly useful to the derivation of the personally identifiable information.

3. The computer-readable memory of claim 1, further comprising computer-executable instructions directed to receiving an indication of an area within which user trail information is desired; wherein the replacing the turn and the replacing the at least one segment are only performed outside of the indicated area.

4. The computer-readable memory of claim 3, wherein the computer-executable instructions for modifying the first user trail further comprise computer-executable instructions for scrambling the first user trail with other user trails outside of the indicated area while maintaining unchanged those segments of the first user trail inside of the indicated area.

5. The computer-readable memory of claim 1, wherein the dividing the first user trail into two or more sub-trails further comprises discarding at least one of the two or more sub-trails to prevent subsequent recombination of the two or more sub-trails into the first user trail.

6. The computer-readable memory of claim 1, wherein the dividing the first user trail into two or more sub-trails further comprises modifying timestamps of ones of the discrete locations that are part of at least one of the two or more sub-trails to prevent subsequent recombination of the two or more sub-trails into the first user trail.

7. The computer-readable memory of claim 1, comprising further computer-executable instructions for: generating an aggregated trail comprising the new first user trail by aggregating the new first user trail with other user trails and providing access to the aggregated trail to a third party.

8. The computer-readable memory of claim 7, wherein the computer-executable instructions for generating the aggregated trail further comprise computer executable instructions for: defining a grid comprising grid cells through which the new first user trail and the other user trails pass, generating an indicator for individual ones of the grid cells signifying a quantity of the new first user trail and the other user trails that pass through the individual ones of the grid cells.

9. The computer-readable memory of claim 7, wherein the computer-executable instructions for generating the aggregated trail further comprise computer executable instructions for: generating a segment between a first point on the new first user trail and a second point on a first aggregated trail comprising an aggregation of at least some of the other user trails, identifying an average point on the generated segment representing a weighted average between the first point and the second point; and modifying the first aggregated trail to pass through the average point.

10. The computer-readable memory of claim 7, comprising further computer-executable instructions for: applying at least one of: a resampling and a re-resolutioning to the aggregated trail to further remove the personally identifiable information prior to providing access to the aggregated trail.

11. The computer-readable memory of claim 7, comprising further computer-executable instructions for: delaying the providing access to the aggregated trail until the other user trails are of a sufficient quantity to remove the personally identifiable information.

12. One or more computer-readable memory comprising computer-executable instructions for removing personally identifiable information from user trails, the computer-executable instructions directed to steps comprising:

receiving a first user trail comprising a first set of discrete locations of a first computing device, the first user trail having personally identifiable information;
receiving at least two other user trails; and
generating an aggregated trail by aggregating the first user trail with the at least two other user trails by performing at least one of:
defining a grid comprising grid cells through which the first user trail and the at least two other user trails pass and generating an indicator for individual ones of the grid cells signifying a quantity of the first user trail and the at least two other user trails that pass through the individual ones of the grid cells; and
generating a segment between a first point on the first user trail and a second point on a first aggregated trail comprising an aggregation of the at least two other user trails, identifying an average point on the generated segment representing a weighted average between the first point and the second point; and modifying the first aggregated trail to pass through the average point.

13. The computer-readable memory of claim 12, wherein the generating the indicator for the individual ones of the grid cells comprises generating a vector for individual ones of the grid cells identifying an average direction of motion of the first user trail and the at least two other user trails that pass through the individual ones of the grid cells.

14. The computer-readable memory of claim 13, wherein the generating the vector for the individual ones of the grid cells comprises generating multiple time-dependent vectors for each of the individual ones of the grid cells, the multiple time-dependent vectors identifying the average direction of motion of the first user trail and the at least two other user trails that pass through the individual ones of the grid cells during pre-defined time intervals associated with the multiple time-dependent vectors.

15. The computer-readable memory of claim 14, comprising further computer-executable instructions for applying a random time adjustment to timestamps in the first user trail and the at least two other user trails.

16. The computer-readable memory of claim 12, wherein the generating the indicator for the individual ones of the grid cells comprises generating statistical distributions, for individual ones of the grid cells, the statistical distributions representing a direction of motion of the first user trail and the at least two other user trails that pass through the individual ones of the grid cells.

17. The computer-readable memory of claim 12, wherein the first point on the first user trail is a location point corresponding to one of the discrete locations, and the second point on the first aggregated trail is a point, on the first aggregated trail, that is closest to the first point.

18. The computer-readable memory of claim 12, comprising further computer-executable instructions for tessellating the first aggregated trail; and wherein the second point on the first aggregated trail is a point on the first aggregated trail at which the first aggregated trail was tessellated, the segment is orthogonal to a tessellated segment of the first aggregated trail at the second point and the first point on the first user trail is a point on the first user trail at which the segment intersects the first user trail.

19. The computer-readable memory of claim 12, comprising further computer-executable instructions for: applying at least one of: a resampling and a re-resolutioning to the aggregated trail to further remove the personally identifiable information prior to providing access to the aggregated trail.

20. A method for removing personally identifiable information from user trails, the method comprising the steps of:

receiving a first user trail comprising a first set of discrete locations of a first computing device, the first user trail having personally identifiable information;

modifying the first user trail to generate a new first user trail without the personally identifiable information by removing the personally identifiable information by performing at least one of:

replacing a turn in the first user trail with a sequence of equivalent turns, each of which differs from the identified turn, the sequence of equivalent turns having, in aggregate, a same starting point as the replaced turn and a same ending point as the replaced turn;

replacing at least one segment of the first user trail, the at least one segment being less than the whole first user trail, with one or more segments differing from the replaced at least one segment, the one or more segments having a same starting point as the replaced at least one segment and a same ending point as the replaced at least one segment;

dividing the first user trail into two or more sub-trails and identifying at least one of the two or more sub-trails as having been generated by a different computing device; and exchanging a portion of the first user trail with a portion of a second user trail intersecting with the first user trail, the exchanged portions of the first and second user trails having the intersection as an endpoint.

* * * * *